(12) United States Patent
Nakagawa

(10) Patent No.: US 11,373,470 B1
(45) Date of Patent: Jun. 28, 2022

(54) SYSTEMS AND METHODS FOR UNLOCKING A DIGITAL LOCK

(71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 17/227,784

(22) Filed: Apr. 12, 2021

(51) Int. Cl.
*G07C 9/00* (2020.01)
*H04L 9/08* (2006.01)

(52) U.S. Cl.
CPC ..... *G07C 9/00857* (2013.01); *G07C 9/00309* (2013.01); *G07C 9/00571* (2013.01); *H04L 9/0836* (2013.01); *G07C 2009/00388* (2013.01)

(58) Field of Classification Search
CPC ............ G07C 9/00857; G07C 9/00309; G07C 9/00571; G07C 2009/00388; H04L 9/0836
USPC ....................................................... 340/5.65
See application file for complete search history.

(56) References Cited

U.S. PATENT DOCUMENTS

| | | | | |
|---|---|---|---|---|
| 6,552,650 B1* | 4/2003 | Gokcebay | ........... | E05B 47/0611 340/5.65 |
| 7,606,558 B2* | 10/2009 | Despain | ................... | G07C 9/27 455/410 |
| 9,367,978 B2* | 6/2016 | Sullivan | ............. | G07C 9/00571 |
| 9,396,598 B2* | 7/2016 | Daniel-Wayman | ........................ | G07C 9/00309 |
| 9,704,316 B2* | 7/2017 | Kirkjan | ............. | G07C 9/00182 |
| 9,841,743 B2* | 12/2017 | Davis | ..................... | G05B 19/02 |
| 9,858,737 B2* | 1/2018 | Davidsson | ............ | H04W 12/08 |
| 9,858,740 B2* | 1/2018 | Borg | .................. | G07C 9/00817 |
| 10,115,256 B2* | 10/2018 | Davis | .................... | H04W 12/08 |
| 10,192,380 B2* | 1/2019 | Borg | ........................ | G07C 9/27 |
| 10,382,608 B2* | 8/2019 | Gerhardt | ............... | H04W 12/08 |
| 10,404,714 B1* | 9/2019 | Masters | ................ | H04L 63/105 |
| 10,749,693 B2* | 8/2020 | Papas | .................... | H04L 9/3271 |
| 10,755,509 B2* | 8/2020 | Saeedi | .................... | G07C 9/27 |
| 10,861,263 B2* | 12/2020 | Ribas | ................. | G07C 9/00817 |
| 11,030,837 B2* | 6/2021 | Stromberg | .......... | G07C 9/00857 |
| 2002/0180582 A1* | 12/2002 | Nielsen | .................... | G07C 9/21 340/5.6 |
| 2012/0213362 A1* | 8/2012 | Bliding | .............. | G07C 9/00309 380/44 |
| 2021/0327177 A1* | 10/2021 | Kirkjan | ............. | G07C 9/00309 |

* cited by examiner

*Primary Examiner* — Nam V Nguyen
(74) *Attorney, Agent, or Firm* — Snell & Wilmer LLP

(57) ABSTRACT

Systems and methods for unlocking a digital lock. A system may include a master key and a nested key. The master key may be configured to transmit authorization data to the digital lock or the nested key. The nested key may be configured to unlock the digital lock upon the digital lock or the nested key receiving the authorization data. The nested key may be configured to transmit the authorization data to the digital lock to unlock the digital lock if the master key is configured to transmit the authorization data to the nested key. Alternatively, the nested key may be configured to transmit key data to the digital lock to unlock the digital lock if the master key is configured to transmit the authorization data to the digital lock.

13 Claims, 6 Drawing Sheets

SYSTEMS AND METHODS FOR UNLOCKING A DIGITAL LOCK

BACKGROUND

1. Field

The present disclosure is directed to systems and methods for unlocking a digital lock.

2. Description of the Related Art

In one's daily life, situations may arise where one may wish to control and monitor another's access to a place, location, object, or item (e.g., a vehicle, a house, a hotel room, a rental unit, a mailbox, etc.). For example, parents may wish to control their children's unlocking of a front door of their home from the inside or their vehicle from the outside. Parents may require approval prior to unlocking the front door or their vehicle. Also, parents may desire to allow unlocking only within certain times of the day or for a certain duration. In another example, a person may desire to control a courier's access to a mailbox or a house door for delivery of a package. However, controlling such actions generally require the person wishing to control and monitor access to be physically present or loan keys to the courier or a third party with availability to be physically present.

As such, there is a need for systems and methods for unlocking a digital lock with a master key and a nested key combination.

SUMMARY

Systems and methods for unlocking a digital lock are disclosed. A system may include a master key and a nested key. The master key may transmit authorization data either to the digital lock or the nested key. The nested key may unlock the digital lock upon either the digital lock or the nested key receiving the authorization data. In some embodiments, the nested key may transmit the authorization data to the digital lock to unlock the digital lock if the master key transmits the authorization data to the nested key. In some embodiments, the nested key may transmit a first set of key data to the digital lock to unlock the digital lock if the master key transmits a second set of key data that is a counterpart of the first set of key data to the nested key or the digital lock.

In accordance with an embodiment of the present disclosure, there may be a system for unlocking a digital lock. The system may include a nested key and a master key. The nested key may be configured to unlock the digital lock upon the nested key receiving authorization data. The master key may be configured to transmit the authorization data to the nested key. The nested key may be configured to unlock the digital lock by transmitting the authorization data to the digital lock.

The authorization data may be a first portion of the key data. The nested key may be configured to unlock the digital lock by transmitting the first portion of the key data and a second portion of the key data stored in a memory of the nested key to the digital lock. The nested key may be configured to transmit a second portion of the key data stored in a memory of the nested key to the digital lock. The master key may be configured to receive a notification from the nested key that the nested key has transmitted the second portion of the key data to the digital lock. The master key may be further configured to transmit the first portion of the key data to the nested key upon receiving the notification. The nested key may be further configured to transmit the first portion of the key data to the digital lock to unlock the digital lock.

The master key may be configured to present to a user of the master key a first option to transmit the first portion of the key data to the nested key. The master key may be further configured to present to the user a second option to not transmit the first portion of the key data to the nested key upon receiving the notification.

The authorization data may be capable of unlocking the digital lock for a limited duration. The nested key may be configured to transmit the authorization data to a second or more nested keys to enable the second or more nested keys to unlock the digital lock where the nested key is a first nested key.

The digital lock may be part of a digital lock system. The digital lock system may have the digital lock as a first digital lock and include a second digital lock controlling access from an opposite side of the first digital lock. The nested key may be configured to unlock the second digital lock without receiving the authorization data.

A system for unlocking a digital lock may include a nested key and a master key. The nested key may be configured to unlock the digital lock upon the digital lock receiving authorization data. The master key may be configured to transmit the authorization data to the digital lock. The nested key may be configured to unlock the digital lock by transmitting key data to the digital lock. The authorization data may be capable of unlocking the digital lock for a limited duration.

The authorization data may be a first portion of the key data. The nested key may be configured to transmit a second portion of the key data stored in a memory of the nested key to the digital lock to unlock the digital lock. The nested key may be configured to transmit a second portion of the key data stored in a memory of the nested key to the digital lock. The master key may be configured to receive a notification from the digital lock that the nested key has transmitted the second portion of the key data to the digital lock. The master key may be further configured to transmit the first portion of the key data to the digital lock upon receiving the notification to unlock the digital lock. The nested key may be configured to transmit a second portion of the key data stored in a memory of the nested key to the digital lock. The nested key may be further configured to transmit a notification to the master key that the nested key has transmitted the second portion of the key data to the digital lock. The master key may be configured to transmit the first portion of the key data to the digital lock to unlock the digital lock upon receiving the notification.

The master key may be configured to present to a user of the master key a first option to transmit the first portion of the key data to the digital lock. The master key may be further configured to present to the user a second option to not transmit the first portion of the key data to the digital lock upon receiving the notification.

The digital lock may be part of a digital lock system. The digital lock system may have the digital lock as a first digital lock and include a second digital lock controlling access from an opposite side of the first digital lock. The nested key may be configured to unlock the second digital lock without the second digital lock receiving the authorization data.

A method for unlocking a digital lock is disclosed. The method may include transmitting, by a master key, authorization data to the digital lock or a nested key. The method may further include receiving, by the digital lock or the nested key, the authorization data. The method may further include verifying, by a processor of the digital lock or the nested key, the authorization data. The method may further include unlocking, by the nested key, the digital lock. The method may further include transmitting, by a first nested key where the nested key is the first nested key, the authorization data to a second or more nested keys to enable the second or more nested keys to unlock the digital lock.

The method may further include transmitting, by the master key, the authorization data to the nested key. The unlocking step may include transmitting, by the nested key, the authorization data to the digital lock. The method may further include transmitting, by the master key, the authorization data to the digital lock. The unlocking step may include transmitting, by the nested key, key data to the digital lock.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The systems and methods described herein unlock a digital lock. The systems and methods may utilize a master key and a nested key. The digital lock may have multiple authentication modes. The authentication modes may advantageously include requiring a master key to send an approval signal (e.g., authentication data, key data) to the digital lock and/or the nested key before the nested key is able to unlock or lock the digital lock. The digital lock may receive the approval signal directly from the master key or the nested key. The authentication modes may further include the nested key being preconfigured with the master key for the master key to allow or deny the nested key to unlock or lock the digital lock. The authentication modes may further include the digital lock to communicate with the master key and the master key allowing or denying the nested key to unlock or lock the digital lock upon communicating with the digital lock. The authentication modes may further include the master key displaying an approval screen when the nested key is attempting to unlock or lock the digital lock for a user of the master key to allow or deny the nested key to unlock or lock the digital lock. The nested key may be advantageously duplicated to replace or serve as an additional nested key.

Figure 1:
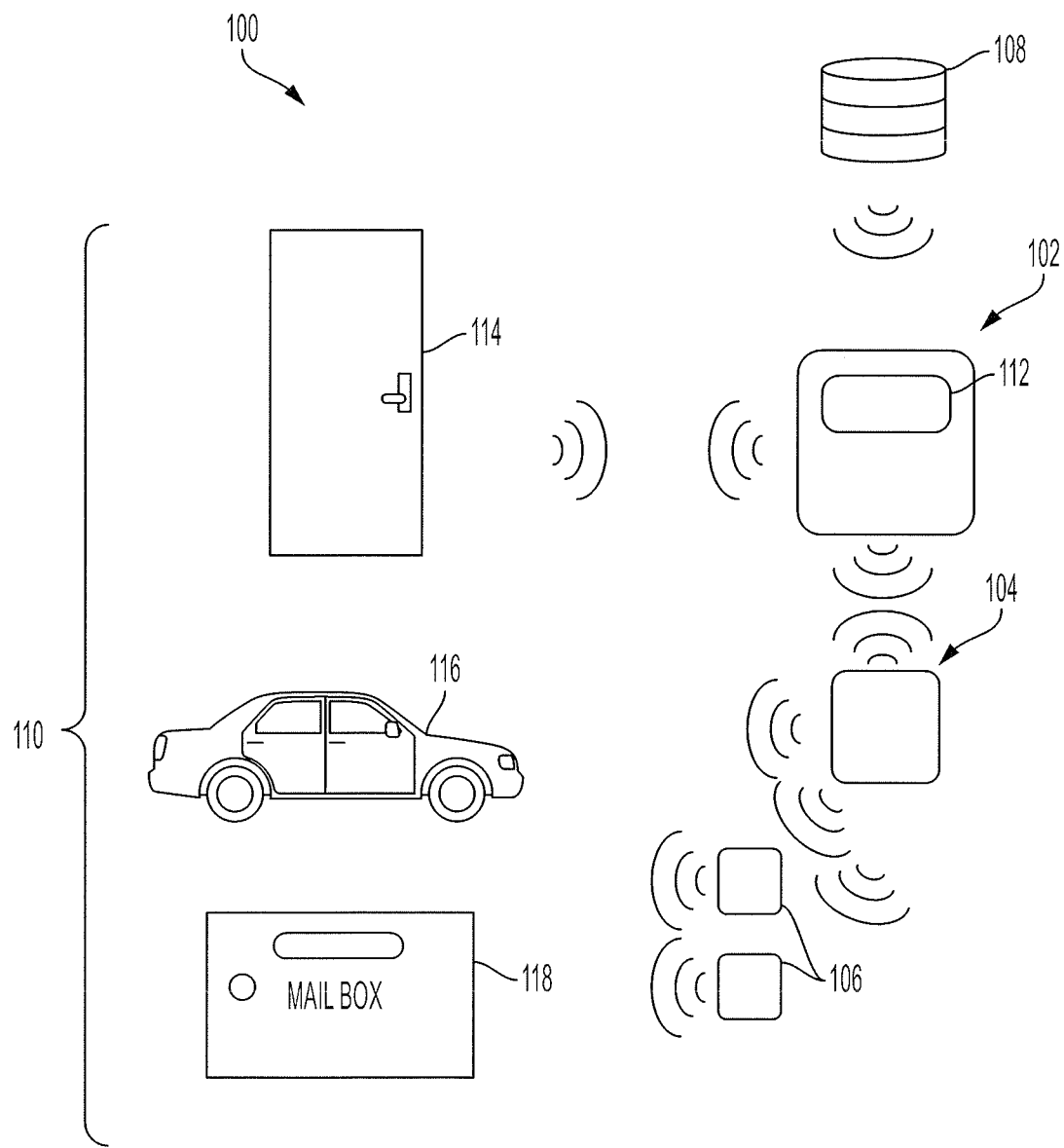
FIG. 1 illustrates a communication network among a master key, a nested key, duplicate nested keys, a server, and access control systems unlock and lock the access control systems according to an aspect of the present disclosure.

FIG. 1 illustrates a system 100 among a master key 102, a nested key 104, duplicate nested keys 106, a server 108, and access control systems 110 to unlock and lock the access control systems 110 according to an aspect of the present disclosure. The master key 102 may be a portable device with wireless connectivity capabilities. The master key 102 may be a mobile phone, a tablet device, a laptop computer, a key fob, a clicker, an access card, a car key, a portable multimedia player, a portable gaming device, and any other portable electronic and electro-mechanical device. The master key 102 may have a display 112. The display 112 may display a user interface, incoming notifications from the nested key 104, the server 108 and/or the access control systems 110, and outgoing approvals and disapprovals to the nested key 104 or the access control systems 110. The master key 102 may be shaped, sized, and weighed to be held and transported with ease. For example, the master key 102 may fit into a pocket. In some embodiments, the master key 102 may be a stationary device, such as a desktop computer, a smart home device, a television, or the like.

The nested key 104 may be a portable device with wireless connectivity capabilities. The nested key 104 may be a mobile phone, a tablet device, a laptop computer, a key fob, a clicker, an access card, a car key, a portable multimedia player, a portable gaming device, and any other portable electronic and electro-mechanical device. The nested key 104 may be shaped, sized, and weighed to be held and transported with ease. For example, the master key 102 may fit into a pocket.

The duplicate nested keys 106 may have the same specifications and capabilities of the nested key 104. A wired or wireless communication may be established between the nested key 104 and one or more duplicate nested keys 106 to transfer data to the duplicate nested keys 106. Following data transfer, the one or more duplicate nested keys 106 may additionally serve as or replace the nested key 104. In some embodiments, the duplicate nested keys 106 may only function as the nested key 104 for a predetermined time. The predetermined time may be determined by a user of the master key 102 or the nested key 104 or a party overseeing the access control systems 110. After lapse of the predetermined time, the transferred data may expire (e.g., be deleted, invalidated, changed, etc.).

The server 108 may store data for the master key 102, the nested key 104, and/or the duplicate nested keys 106 to access. The access may be provided via the Internet. The communication of the devices or keys with the server 108 may be wireless. There may be a plurality of servers 108.

The term "access control systems" may be replaced with "access control devices" throughout this disclosure. The access control systems 110 may be any electronic, mechanical, or electromechanical machine, structure, device, and/or the like that bars, controls, observes, and/or regulates entry or access to a point beyond it. For example, the access control system 110 may be a door lock 114, a vehicle lock system 116, or a mailbox 118. Other examples include but are not limited to security gates, ticket checkpoints (e.g., public transportation, movies, shows, sporting events), delivery lockers, and electronic device lock screens. The access control systems 110 may each have a transceiver to wirelessly exchange information with the master key 102, the nested key 104, and/or the duplicate nested keys 106. The transceiver may include but is not limited to a Bluetooth, an infrared (IR), a radio frequency (RF), or a WiFi based communication hardware. In some embodiments, the access control systems 110 may have an inlet in addition to or in lieu of the wireless transceiver. The inlet may enable the master key 102, the nested key 104, and/or the duplicate nested keys 106 to be physically inserted and coupled to the access control systems 110 to exchange information. In addition, the access control systems 110 may have mechanical locks, keypads, proximity readers, biometric scanners, quick response (QR) code scanners, and/or the like that have functionality irrespective of interaction with the master key 102, the nested key 104, and/or the duplicate nested keys 106. The access control systems 110 may include double-sided locks. In other words, the access control systems 110 may include a first lock on one side of the access control system and a second lock on an opposite side of the first lock to control access from two opposite directions. The first lock and the second lock may have different entry requirements. For example, the first lock may not require a key or an authorization while the second lock may require a key or an authorization.

The master key 102 may exchange data with the nested key 104. For example, the master key 102 may transmit authorization data or key data to the nested key 104. Authorization data may authorize a device possessing the authorization data to access or restrict (i.e., unlock or lock) an access control system 110. The authorization data and the key data may include numbers, text, symbols, code, and/or shapes. The key data may allow a device (i.e., master key and/or nested key) possessing the key data to unlock or lock an access control system 110. The key data may have counterparts. For example, unlocking an access control system 110 may require a first set of key data as well as a second set of key data. Without possession of both sets of key data, the device may not be able to unlock the access control system 110. In some embodiments, more than two sets of key data may be required. In some embodiments, a plurality of master keys 102 or nested keys 104 may each possess different key data sets to collectively unlock an access control system 110. In another example, the nested key 104 may transmit a transmission notification to the master key 102. The transmission notification may notify a device that a key data set has been successfully transmitted to an access control system 110 and prompt the device to transmit the counterpart key data set. The master key 102, the nested key 104, and the duplicate nested keys 106 may be paired with each other prior to wireless data transmission to identify the device to transmit the data to as well as ensure only the intended device or devices receive the data being transmitted.

The master key 102 may exchange data with the access control systems 110. For example, the master key 102 may transmit the authorization data or the key data to the access control systems 110. In another example, the access control systems 110 may transmit a transmission notification to the master key 102. The nested key 104 may transmit the authorization data or the key data to the access control systems 110 and to the duplicate nested keys 106. The duplicate nested keys 106 may also transmit the authorization data or the key data to the access control systems 110.

The authorization data, the key data, and/or the transmission notification may only function for a predetermined time. The predetermined time may be set by the user of the master key 102 or a party overseeing the access control systems 110. After lapse of the predetermined time, they may expire (e.g., be deleted, invalidated, changed, etc.).

Figure 2:
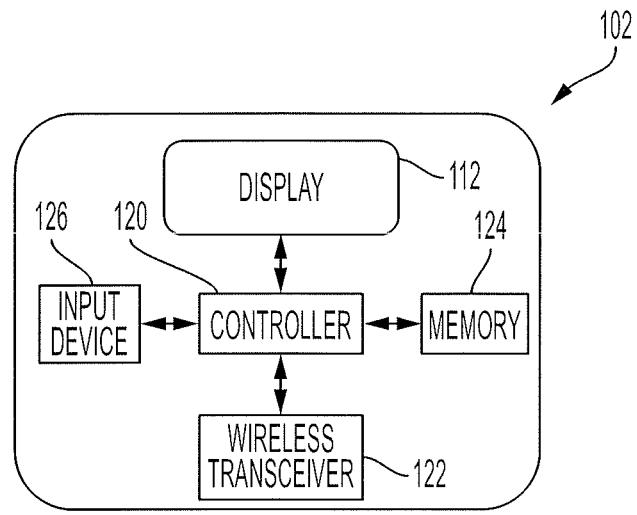
FIG. 2 illustrates a block diagram of the master key of FIG. 1 according to an aspect of the present disclosure.

FIG. 2 illustrates a block diagram of the master key 102 according to an aspect of the present disclosure. The master key 102 may include a display 112, a controller 120, a wireless transceiver 122, a memory 124, and an input device 126.

The display 112 may be a liquid crystal display (LCD), a light-emitting diode display (LED), an organic light emitting diode (OLED), a plasma display, a cathode-ray tube (CRT) display, a digital light processing display (DLPT), a microdisplay, a projection display, or any other display appreciated by one of ordinary skill in the art. The display 112 may display user interfaces, text, images, and/or the like. For example, the display 112 may display transmission notifications received by the master key 102. In another example, the display 112 may display identifying information pertaining to the authorization data and/or the key data to aid the user in selecting the appropriate authorization data and/or key data to unlock a certain access control system 110. The display 112 may be a touchscreen and combined or integrated with the input device 126.

The controller 120 may be one or more integrated circuits configured to control and manage the operations of the master key 102. The controller 120 may include one or more processors configured to execute machine-readable instructions. The one or more processors may be microprocessors or microcontrollers by example. The controller 120 may be coupled to the wireless transceiver 122, the memory 124, the display 112, and the input device 126.

The wireless transceiver 122 may include but is not limited to a Bluetooth, an IR, an RF, or a WiFi based communication hardware. In some embodiments, some or all of the aforementioned communication methods may be available for selection of a user of the master key 102 based on preference or suitability (e.g., signal travel distance, signal availability, signal interference, signal travel speed, etc.). The wireless transceiver 122 may utilize another wireless communication technology appreciated by one of ordinary skill in the art.

The memory 124 may be a random-access memory (RAM), a disk, a flash memory, optical disk drives, hybrid memory, or any other storage medium that can store data. The memory 124 may store program code that are executable by the controller 120. The memory 124 may store data in an encrypted or any other suitable secure form. In some embodiments, the master key 102 may retrieve data from the server 108 (see FIG. 1) instead of or in addition to the memory 124.

The input device 126 may receive visual, auditory, and/or touch input. For example, the input device 126 may be a camera, a microphone, a touchscreen, a button, or a remote. In some embodiments, the input device 126 may be integrated with the display 112. The user of the master key 102 may input commands and information into the input device 126 to control the controller 120. For example, the input device 126 may receive biometric information, the user's voice, and/or the user's touch input with one or more fingers.

Figure 3:
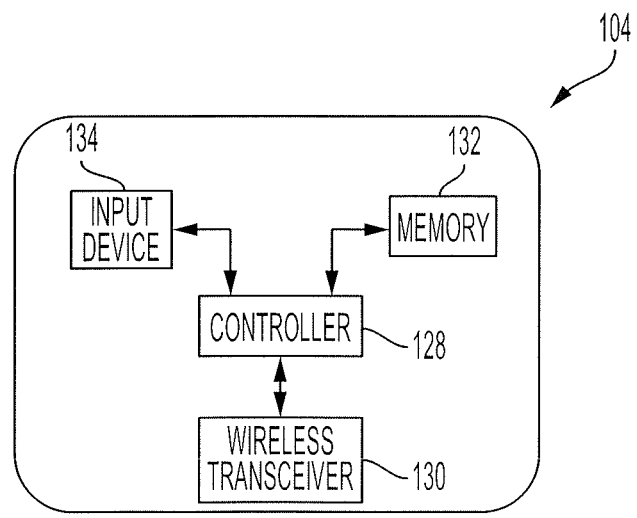
FIG. 3 illustrates a block diagram of the nested key of FIG. 1 according to an aspect of the present disclosure.

FIG. 3 illustrates a block diagram of the nested key 104 according to an aspect of the present disclosure. The nested key 104 may include a controller 128, a wireless transceiver 130, a memory 132, and an input device 134. In some embodiments, the nested key 104 may have the same components of the master key 102, such as a display.

The controller 128 may be one or more integrated circuits configured to control and manage the operations of the nested key 104. The controller 128 may include one or more processors configured to execute machine-readable instructions. The one or more processors may be microprocessors or microcontrollers by example. The controller 128 may be coupled to the wireless transceiver 130, the memory 132, and the input device 134.

The wireless transceiver 130 may include but is not limited to a Bluetooth, an IR, an RF, or a WiFi based communication hardware. In some embodiments, some or all of the aforementioned communication methods may be available for selection of a user of the nested key 104 based on preference or suitability (e.g., signal travel distance, signal availability, signal interference, signal travel speed, etc.). The wireless transceiver 130 may utilize another wireless communication technology appreciated by one of ordinary skill in the art.

The memory 132 may be a RAM, a disk, a flash memory, optical disk drives, hybrid memory, or any other storage medium that can store data. The memory 132 may store program code that are executable by the controller 128. The memory 132 may store data in an encrypted or any other suitable secure form. In some embodiments, the nested key 104 may retrieve data from the server 108 (see FIG. 1) instead of or in addition to the memory 132.

The input device 134 may receive visual, auditory, and/or touch input. For example, the input device 134 may be a camera, a microphone, a touchscreen, a button, or a remote. The user of the nested key 104 may input commands and information into the input device 134 to control the controller 128. For example, the input device 134 may receive biometric information, the user's voice, and/or the user's touch input with one or more fingers.

Figure 4:
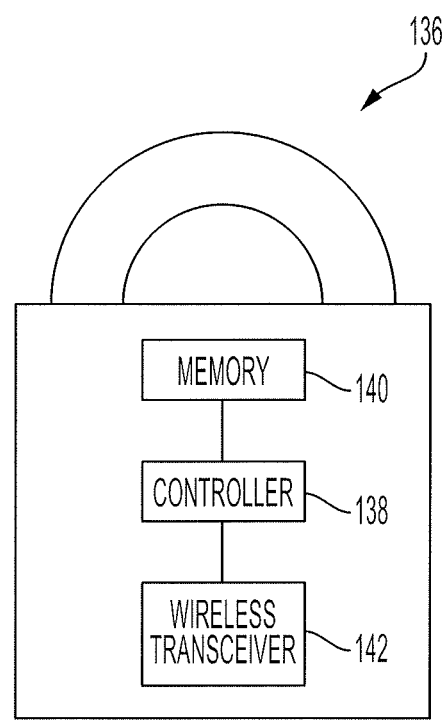
FIG. 4 illustrates a block diagram of a lock of an access control system of FIG. 1 according to an aspect of the present disclosure.

FIG. 4 illustrates a block diagram of a lock 136 of an access control system 110 (see FIG. 1) according to an aspect of the present disclosure. The lock 136 may include a controller 138, a memory 140, and U wireless transceiver 142. In some embodiments, the lock may have a display and/or an input device. For example, the display may show a notification that access was granted or denied upon an unlocking attempt. In another example, the display may show a confirmation that the lock 136 was successfully locked. The input device may include mechanical locks, keypads, proximity readers, biometric scanners, quick response (QR) code scanners, and/or the like that have functionality irrespective of interaction with the master key 102, the nested key 104, and/or the duplicate nested keys 106 (see FIG. 1).

The controller 138 may be one or more integrated circuits configured to control and manage the operations of the lock 136. The controller 138 may include one or more processors configured to execute machine-readable instructions. The one or more processors may be microprocessors or microcontrollers by example. The controller 138 may be coupled to the wireless transceiver 142 and the memory 140.

The memory 140 may be a RAM, a disk, a flash memory, optical disk drives, hybrid memory, or any other storage medium that can store data. The memory 140 may store program code that are executable by the controller 138. The memory 140 may store data in an encrypted or any other suitable secure form. In some embodiments, the lock 136 may retrieve data from the server 108 (see FIG. 1) instead of or in addition to the memory 140.

The wireless transceiver 142 may include but is not limited to a Bluetooth, an IR, an RF, or a WiFi based communication hardware. In some embodiments, some or all of the aforementioned communication methods may be available for selection of a user of the lock 136 based on preference or suitability (e.g., signal travel distance, signal availability, signal interference, signal travel speed, etc.). The wireless transceiver 142 may utilize another wireless communication technology appreciated by one of ordinary skill in the art.

Figure 5:
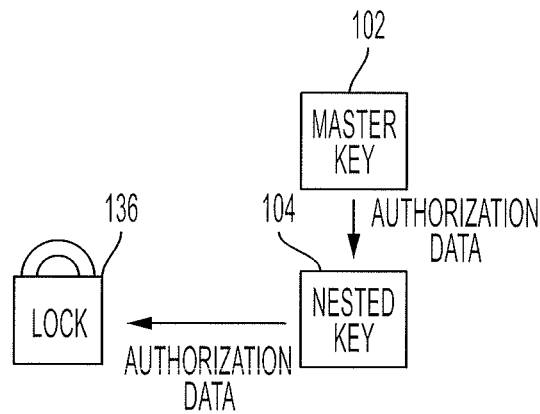
FIG. 5 illustrates a block diagram of data exchange among the master key, the nested key, and the lock to unlock the lock according to an aspect of the present disclosure.

FIG. 5 illustrates a block diagram data exchange among the master key 102, the nested key 104, and the lock 136 to unlock the lock 136 according to an aspect of the present disclosure. First, the master key 102 may transmit authorization data necessary to unlock the lock 136 to the nested key 104. The transmission may be from the wireless transceiver 122 (see FIG. 2) to the wireless transceiver 130 (see FIG. 3). In some embodiments, the transmission may be wired. The master key 102 may retrieve the authorization data from the memory 124 (see FIG. 2) or the server 108 (see FIG. 1). Once the authorization data is transmitted to the nested key 104, the nested key 104 may store the authorization data in the memory 132 (see FIG. 3) or the server 108. The nested key 104 may then transmit the authorization data to the lock 136. The lock 136 may receive the authorization data via the wireless transceiver 142 (see FIG. 4). The lock 136 may store the authorization data via the memory 140 (see FIG. 4). The lock 136 may verify the authorization data by the processor of the controller 138 (see FIG. 4). For example, the processor may compare the authorization data received to the authorization data originally stored in the memory 140 or retrieved from the server 108. Once the processor verifies the authorization data, the controller 138 may actuate the lock 136 to unlock the lock 136. In some embodiments, the authorization data may be required to lock the lock 136.

Figure 6:
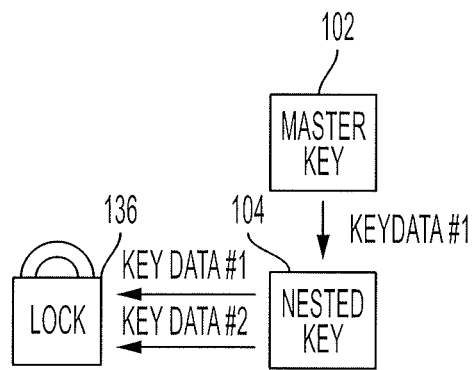
FIG. 6 illustrates a block diagram of data exchange among the master key, the nested key, and the lock to unlock the lock according to an aspect of the present disclosure.

FIG. 6 illustrates a block diagram of data exchange among the master key 102, the nested key 104, and the lock 136 to unlock the lock according to an aspect of the present disclosure. First, the master key 102 may transmit a first set of key data necessary to unlock the lock 136 to the nested key 104. The transmission may be from the wireless transceiver 122 (see FIG. 2) to the wireless transceiver 130 (see FIG. 3). In some embodiments, the transmission may be wired. The master key 102 may retrieve the first set of key data from the memory 124 (see FIG. 2) or the server 108 (see FIG. 1). Once the first set of key data is transmitted to the nested key 104, the nested key 104 may store the first set of key data in the memory 132 (see FIG. 3) or the server 108. The transmission of the first set of key data to the nested key 104 may prompt the controller 128 (see FIG. 3) to transmit the first set of key data to the lock 136 along with a second set of key data complementing the first set of key data. The nested key 104 may retrieve the second set of key data from the memory 132 (see FIG. 3) or the server 108. The first set of key data and the second set of key data may not individually unlock the lock 136, but once combined may unlock the lock 136. The lock 136 may receive the first and second sets of key data via the wireless transceiver 142 (see FIG. 4). The lock 136 may store the first and second sets of key data via the memory 140 (see FIG. 4). The lock 136 may verify the first and second sets of key data by the processor of the controller 138 (see FIG. 4). For example, the processor may compare the first and second sets of key data received to the key data originally stored in the memory 140 or retrieved from the server 108. In another example, the first set of key data and the second set of key data complementing each other may serve as the verification. Once the processor verifies the first and second sets of key data, the controller 138 may actuate the lock 136 to unlock the lock 136. In some embodiments, the first and second sets of key data may be required to lock the lock 136. In some embodiments, there may be no verification step by the lock 136. In such embodiments, the nested key 104 may verify the first set of key data via its processor, and upon verifying, transmit both the first set and the second set of key data to the lock 136.

Figure 7:
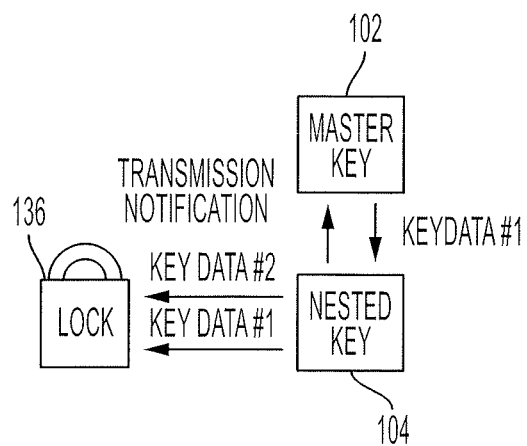
FIG. 7 illustrates a block diagram of data exchange among the master key, the nested key, and the lock to unlock the lock according to an aspect of the present disclosure.

FIG. 7 illustrates a block diagram of data exchange among the master key 102, the nested key 104, and the lock 136 to unlock the lock 136 according to an aspect of the present disclosure. First, the nested key 104 may transmit a second set of key data necessary to unlock the lock 136 to the lock 136. The transmission may be from the wireless transceiver 130 (see FIG. 3) to the wireless transceiver 142 (see FIG. 4). In some embodiments, the transmission may be wired. The nested key 104 may retrieve the second set of key data from the memory 132 (see FIG. 3) or the server 108 (see FIG. 1). Once the second set of key data is transmitted to the lock 136, the lock 136 may store the second set of key data in the memory 140 (see FIG. 4) or the server 108. The transmission of the second set of key data to the lock 136 may prompt the controller 128 (see FIG. 3) of the nested key 104 to transmit a transmission notification to the master key 102. The master key 102 may display the transmission notification on the display 112 (see FIG. 2). A user of the master key 102 may then choose to command the controller 120 (see FIG. 2) via the input device 126 (see FIG. 2) to transmit a first set of key data complementing the second set of key data to the nested key 104 for the nested key to unlock the lock 136. In some embodiments, the transmission of the first set of key data may be prompted automatically by the controller 120 upon the master key 102 receiving the transmission notification. The master key 102 may retrieve the first set of key data from the memory 124 (see FIG. 2) or the server 108.

The nested key 104 may transmit the first set of key data to the lock 136 upon receiving the first set of key data from the master key 102. The transmission may be from the wireless transceiver 130 (see FIG. 3) to the wireless transceiver 142 (see FIG. 4). In some embodiments, the transmission may be wired. The lock 136 may store the first set of key data via the memory 140 (see FIG. 4).

Once both the first set of key data and the second set of key data are received by the lock 136, the lock 136 may verify the first and second sets of key data by the processor of the controller 138 (see FIG. 4). For example, the processor may compare the first and second sets of key data received to the key data originally stored in the memory 140 (see FIG. 4) or retrieved from the server 108 (see FIG. 1). Once the processor verifies the first and second sets of key data, the controller 138 may actuate the lock 136 to unlock the lock 136. In some embodiments, the first and second sets of key data may be required to lock 136. In some embodiments, there may be no verification step by the lock 136. In such embodiments, the nested key 104 may verify the first set of key data via its processor, and upon verifying, transmit both the first set and the second set of key data to the lock 136.

Figure 8:
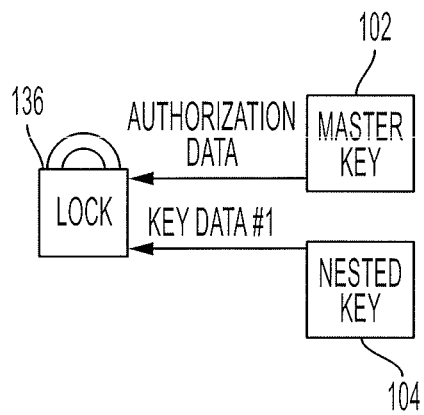
FIG. 8 illustrates a block diagram of data exchange among the master key, the nested key, and the lock to unlock the lock according to an aspect of the present disclosure.

FIG. 8 illustrates a block diagram of data exchange among the master key 102, the nested key 104, and the lock 136 to unlock the lock 136 according to an aspect of the present disclosure. First, the master key 102 may transmit authorization data necessary to have the nested key 104 unlock the lock 136 to the lock 136. The transmission may be from the wireless transceiver 122 (see FIG. 2) to the wireless transceiver 142 (see FIG. 4). In some embodiments, the transmission may be wired. The master key 102 may retrieve the authorization data from the memory 124 (see FIG. 2) or the server 108 (see FIG. 1). Once the authorization data is transmitted to the lock 136, the lock 136 may store the authorization data in the memory 140 (see FIG. 4) or the server 108. The nested key 104 may then transmit key data to the lock 136. The lock 136 may receive the key data via the wireless transceiver 142 (see FIG. 4). The lock 136 may store the key data via the memory 140. The lock 136 may verify the key data by the processor of the controller 138 (see FIG. 4). For example, the processor may determine whether the previously received authorization data authorizes or matches the key data. Once the processor verifies the key data, the controller 138 may actuate the lock 136 to unlock the lock 136. In some embodiments, the authorization data may be required to lock the lock 136.

Figure 9:
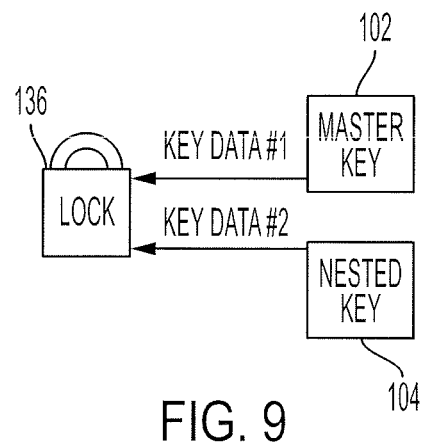
FIG. 9 illustrates a block diagram of data exchange among the master key, the nested key, and the lock to unlock the lock according to an aspect of the present disclosure.

FIG. 9 illustrates a block diagram of data exchange among the master key 102, the nested key 104, and the lock 136 to unlock the lock 136 according to an aspect of the present disclosure. First, the master key 102 may transmit a first set of key data necessary to the lock 136. The transmission may be from the wireless transceiver 122 (see FIG. 2) to the wireless transceiver 142 (see FIG. 4). In some embodiments, tile transmission may be wired. The master key 102 may retrieve the first set of key data from the memory 124 (see FIG. 2) or the server 108 (see FIG. 1). Once the first set of key data is transmitted to the lock 136, the lock 136 may store the first set of key data in the memory 140 (see FIG. 4) or the server 108. Then, the nested key 104 may transmit the second set of key data to the lock 136 complementing the first set of key data. The nested key 104 may retrieve the second set of key data from the memory 132 (see FIG. 3) or the server 108. The first set of key data and the second set of key data may not individually unlock the lock 136, but once combined may unlock the lock 136. The lock 136 may receive the second set of key data via the wireless transceiver 142. The lock 136 may store the second set of key data via the memory 140. The lock 136 may verify the first and second sets of key data by the processor of the controller 138 (see FIG. 4). For example, the processor may compare the first and second sets of key data received to the key data originally stored in the memory 140 or retrieved from the server 108. In another example, the first set of key data and the second set of key data complementing each other may serve as the verification. Once the processor verifies the first and second sets of key data, the controller 138 may actuate the lock 136 to unlock the lock 136. In some embodiments, the first and second sets of key data may be required to lock the lock 136.

Figure 10:
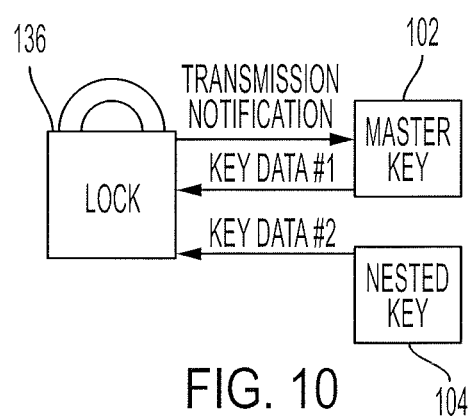
FIG. 10 illustrates a block diagram of data exchange among the master key, the nested key, and the lock to unlock the lock according to an aspect of the present disclosure.

FIG. 10 illustrates a block diagram of data exchange among the master key 102, the nested key 104, and the lock 136 to unlock the lock 136 according to an aspect of the present disclosure. First, the nested key 104 may transmit a second set of key data necessary to unlock the lock 136 to the lock 136. The transmission may be from the wireless transceiver 130 (see FIG. 3) to the wireless transceiver 142 (see FIG. 4). In some embodiments, the transmission may be wired. The nested key 104 may retrieve the second set of key data from the memory 132 (see FIG. 3) or the server 108 (see FIG. 1). Once the second set of key data is transmitted to the lock 136, the lock 136 may store the second set of key data in the memory 140 (see FIG. 4) or the server 108. The transmission of the second set of key data to the lock 136 may prompt the controller 138 (see FIG. 4) of the lock 136 to transmit a transmission notification to the master key 102. The master key 102 may display the transmission notification on the display 112 (see FIG. 2). A user of the master key 102 may then choose to command the controller 120 (see FIG. 2) via the input device 126 (see FIG. 2) to transmit a first set of key data complementing the second set of key data to the lock 136 to unlock the lock 136. In some embodiments, the transmission of the first set of key data may be prompted automatically by the controller 120 upon the master key 102 receiving the transmission notification. The master key 102 may retrieve the first set of key data from the memory 124 (see FIG. 2) or the server 108. The lock 136 may store the first set of key data via the memory 140 (see FIG. 4).

Once both the first set of key data and the second set of key data are received by the lock 136, the lock 136 may verify the first and second sets of key data by the processor of the controller 138 (see FIG. 4). For example, the processor may compare the first and second sets of key data received to the key data originally stored in the memory 140 (see FIG. 4) or retrieved from the server 108 (see FIG. 1). In another example, the first set of key data and the second set of key data complementing each other may serve as the verification. Once the processor verifies the first and second sets of key data, the controller 138 may actuate the lock 136 to unlock the lock 136. In some embodiments, the first and second sets of key data may be required to lock the lock 136.

Figure 11:
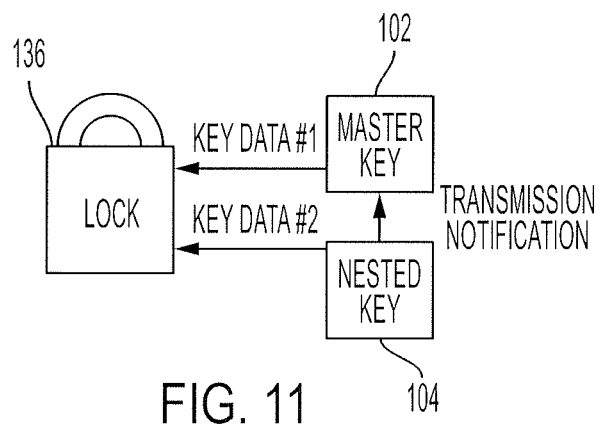
FIG. 11 illustrates a block diagram of data exchange among the master key, the nested key, and the lock to unlock the lock according to an aspect of the present disclosure.

FIG. 11 illustrates a block diagram of data exchange among the master key 102, the nested key 104, and the lock 136 to unlock the lock 136 according to an aspect of the present disclosure. First, the nested key 104 may transmit a second set of key data necessary to unlock the lock 136 to the lock 136. The transmission may be from the wireless transceiver 130 (see FIG. 3) to the wireless transceiver 142 (see FIG. 4). In some embodiments, the transmission may be wired. The nested key 104 may retrieve the second set of key data from the memory 132 (see FIG. 3) or the server 108 (see FIG. 1). Once the second set of key data is transmitted to the lock 136, the lock 136 may store the second set of key data in the memory 140 (see FIG. 4) or the server 108 (see FIG. 1). The transmission of the second set of key data to the lock 136 may prompt the controller 128 (see FIG. 3) of the nested key 104 to transmit a transmission notification to the master key 102. The master key 102 may display the transmission notification on the display 112 (see FIG. 2). A user of the master key 102 may then choose to command the controller 120 (see FIG. 2) via the input device 126 (see FIG. 2) to transmit a first set of key data complementing the second set of key data to the lock 136 to unlock the lock 136. In some embodiments, the transmission of the first set of key data may be prompted automatically by the controller 120 upon the master key 102 receiving the transmission notification. The master key 102 may retrieve the first set of key data from the memory 124 (see FIG. 2) or the server 108. The lock 136 may store the first set of key data via the memory 140 (see FIG. 4).

Once both the first set of key data and the second set of key data are received by the lock 136, the lock 136 may verify the first and second sets of key data by the processor of the controller 138 (see FIG. 4). For example, the processor may compare the first and second sets of key data received to the key data originally stored in the memory 140 (see FIG. 4) or retrieved from the server 108 (see FIG. 1). In another example, the first set of key data and the second set of key data complementing each other may serve as the verification. Once the processor verifies the first and second sets of key data, the controller 138 may actuate the lock 136 to unlock the lock 136. In some embodiments, the first and second sets of key data may be required to lock the lock 136.

Figure 12:
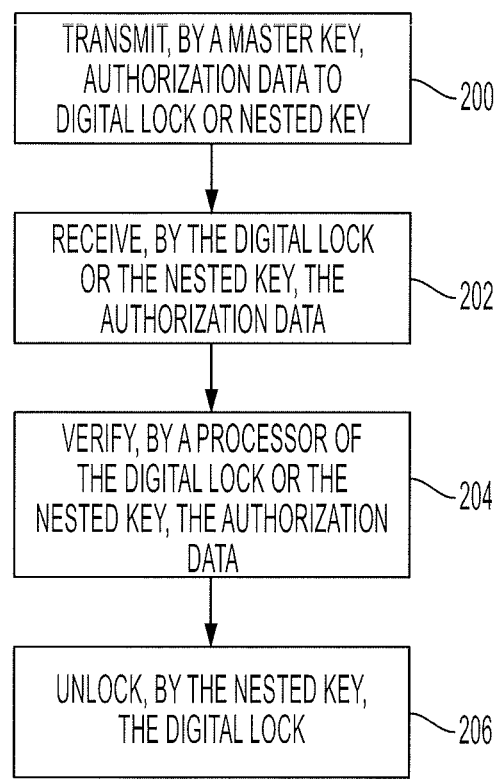
FIG. 12 illustrates a flowchart of a method for unlocking a digital lock according to an aspect of the present disclosure.

FIG. 12 illustrates a flowchart of a method for unlocking the lock 136 (see FIG. 4) of an access control system 110 (see FIG. 1) according to an aspect of the present disclosure. In some embodiments, the method may be repeated to lock the lock 136. The method may be carried out with the master key 102, the nested key 104, and/or duplicate nested keys 106 (see FIG. 1). In block 200, the method may commence with the master key 102 transmitting authorization data to the lock 136 or the nested key 104. If transmission is to the nested key 104, the transmission may be from the wireless transceiver 122 (see FIG. 2) to the wireless transceiver 130 (see FIG. 3). In some embodiments, the transmission may be wired. If transmission is to the lock 136, the transmission may be from the wireless transceiver 122 to the wireless transceiver 142 (see FIG. 4). The master key 102 may retrieve the authorization data from the memory 124 (see FIG. 2) or the server 108 (see FIG. 1).

In block 202, the method may continue with the lock 136 or the nested key 104 receiving the authorization data. If the authorization data is transmitted to the nested key 104, the nested key 104 may store the authorization data in the memory 132 (see FIG. 3) or the server 108. If the authorization data is transmitted to the lock 136, the lock 136 may store the authorization data in the memory 140 (see FIG. 4) or the server 108.

In block 204, the method may continue with the processor of the lock 136 or the nested key 104 verifying the authorization data. For example, the processor of the controller 138 (see FIG. 4) of the lock 136 may compare the authorization data received to the authorization data originally stored in the memory 140 or retrieved from the server 108. In another example, the processor of the controller 128 (see FIG. 3) of the nested key 104 may determine the memory 132 or the server 108 is storing key data complementing the authorization data.

In block 206, the method may conclude with the nested key 104 unlocking the lock 136. In some embodiments, the nested key 104 may transmit the authorization data to the lock 136 for verification and unlocking by actuating the lock 136. The actuation may be facilitated by a motor coupled to the controller 138. In some embodiments, the nested key 104 may transmit the key data to the lock 136. The lock 136 may verify the key data by the processor of the controller 138 (see FIG. 4). For example, the processor may determine whether the previously received authorization data authorizes or matches the key data. Once the processor verifies the key data, the controller 138 may actuate the lock 136 to unlock the lock 136.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for unlocking a digital lock, comprising:
a nested key used to transmit a first portion of key data to the digital lock to unlock the digital lock upon the nested key receiving the first portion of the key data and to transmit a second portion of the key data to the digital lock before transmitting the first portion of the key data; and
a master key used to receive a notification from the nested key that the nested key has transmitted the second portion of the key data to the digital lock and to transmit the first portion of the key data to the nested key upon receiving the notification.

2. The system of claim 1, wherein the second portion of the key data is stored in a memory of the nested key.

3. The system of claim 1, wherein the master key is used to present to a user of the master key a first option to transmit the first portion of the key data to the nested key and a second option to not transmit the first portion of the key data to the nested key upon receiving the notification.

4. The system of claim 1, wherein the digital lock is a first digital lock of a digital lock system, the digital lock system having a second digital lock controlling access from an opposite side of the first digital lock, the nested key used to unlock the second digital lock without receiving the first portion of the key data.

5. The system of claim 1, wherein the nested key is a first nested key, the first nested key used to transmit the first portion of the key data to a second or more nested keys to enable the second or more nested keys to unlock the digital lock.

6. The system of claim 1, wherein the first portion of the key data is for unlocking the digital lock for a limited duration.

7. A system for unlocking a digital lock, comprising:
a nested key used to transmit a second portion of key data to the digital lock to unlock the digital lock upon the digital lock receiving a first portion of the key data; and
a master key used to receive a notification from the digital lock or the nested key that the nested key has transmitted the second portion of the key data to the digital lock and to transmit the first portion of the key data to the digital lock upon receiving the notification.

8. The system of claim 7, wherein the second portion of the key data is stored in a memory of the nested key.

9. The system of claim 7, wherein the master key is used to present to a user of the master key a first option to transmit the first portion of the key data to the digital lock and a second option to not transmit the first portion of the key data to the digital lock upon receiving the notification.

10. The system of claim 7, wherein the digital lock is a first lock of a digital lock system, the digital lock system having a second digital lock controlling access from an opposite side of the first digital lock, the nested key used to unlock the second digital lock without the second digital lock receiving the first portion of the key data.

11. The system of claim 7, wherein the first portion of the key data is for unlocking the digital lock for a limited duration.

12. A method for unlocking a digital lock comprising:
transmitting, by a nested key, a second portion of key data to the digital lock;
receiving, by a master key, a notification from the digital lock or the nested key that the nested key has transmitted the second portion of the key data to the digital lock;
transmitting, by the master key, a first portion of the key data to the nested key;
receiving, by the nested key, the first portion of the key data;
verifying, by the nested key, the first portion of the key data; and
unlocking, by nested key, the digital lock by transmitting the first portion of the key data to the digital lock.

13. The method of claim 12, wherein the nested key is a first nested key, further comprising transmitting, by the first nested key, the first portion of the key data to a second or more nested keys to enable the second or more nested keys to unlock the digital lock.

* * * * *